United States Patent
Bian et al.

(10) Patent No.: US 11,092,740 B1
(45) Date of Patent: Aug. 17, 2021

(54) POLARIZERS WITH MULTIPLE STACKED LAYERS

(71) Applicant: GLOBALFOUNDRIES U.S. Inc., Santa Clara, CA (US)

(72) Inventors: Yusheng Bian, Ballston Lake, NY (US); Bo Peng, Wappingers Falls, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/850,350

(22) Filed: Apr. 16, 2020

(51) Int. Cl.
*G02B 6/10* (2006.01)
*G02B 5/30* (2006.01)

(52) U.S. Cl.
CPC ........... *G02B 6/105* (2013.01); *G02B 5/3066* (2013.01)

(58) Field of Classification Search
CPC ...... G02B 6/105; G02B 6/2773; G02B 6/276; G02B 6/2713; G02B 5/3066
See application file for complete search history.

(56) References Cited

U.S. PATENT DOCUMENTS

| | | | | |
|---|---|---|---|---|
| 9,502,069 | B2 * | 11/2016 | Peng | G11B 5/314 |
| 10,641,956 | B1 * | 5/2020 | Bian | G02B 6/125 |
| 10,996,398 | B1 * | 5/2021 | Bian | G02B 6/272 |
| 2018/0292605 | A1 * | 10/2018 | An | G02B 6/105 |
| 2019/0227230 | A1 * | 7/2019 | Novack | G02B 6/4206 |

OTHER PUBLICATIONS

Yusheng Bian et al,. "Polarizers With Confinement Cladding" filed Nov. 18, 2019 as U.S. Appl. No. 16/686,782.
Yusheng Bian et al., "Polarizers and Polarization Splitters Phase-Matched With a Back-End-of-Line Layer" filed Mar. 4, 2019 as U.S. Appl. No. 16/291,346.
X. Guan, P. Xu, Y. Shi, and D. Dai, "Ultra-compact broadband TM-pass Polarizer Using a Silicon Hybrid Plasmonic Waveguide Grating," in Asia Communications and Photonics Conference 2013, OSA Technical Digest (online) (Optical Society of America, 2013), paper ATh4A.2.
Zhou et al. "Hyperuniform disordered photonic bandgap polarizers", Journal of Applied Physics 126, 113106 (2019).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019.
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

* cited by examiner

*Primary Examiner* — Chris H Chu
(74) *Attorney, Agent, or Firm* — Thompson Hine LLP; Francois Pagette

(57) ABSTRACT

Structures for a polarizer and methods of forming a structure for a polarizer. A first slotted waveguide component is positioned over a first waveguide core, and a second slotted waveguide component positioned over the first slotted waveguide component. The first slotted waveguide component includes a second waveguide core and a third waveguide core separated by a first slot, and the second slotted waveguide component includes a fourth waveguide core and a fifth waveguide core separated by a second slot. The first waveguide core is laterally aligned with the first slot and the second slot.

20 Claims, 6 Drawing Sheets

US 11,092,740 B1

POLARIZERS WITH MULTIPLE STACKED LAYERS

BACKGROUND

The present invention relates to photonics chips and, more specifically, to structures for a polarizer and methods of forming a structure for a polarizer.

Photonics chips are used in many applications and systems such as data communication systems and data computation systems. A photonics chip integrates optical components, such as waveguides, optical switches, and polarizers, and electronic components, such as field-effect transistors, into a unified platform. Among other factors, layout area, cost, and operational overhead may be reduced by the integration of both types of components.

Polarizers are a type of optical component commonly found in photonics chips. A polarizer is configured to receive an optical signal containing multiple modes (e.g., transverse electric (TE) mode and transverse magnetic (TM) mode) and to allow only one mode to propagate while the other mode is eliminated.

Improved structures for a polarizer and methods of forming a structure for a polarizer are needed.

SUMMARY

In an embodiment of the invention, a structure is provided for a polarizer. The structure includes a first waveguide core, a first slotted waveguide component positioned over the first waveguide core, and a second slotted waveguide component positioned over the first slotted waveguide component. The first slotted waveguide component includes a second waveguide core and a third waveguide core separated by a first slot, and the second slotted waveguide component includes a fourth waveguide core and a fifth waveguide core separated by a second slot. The first waveguide core is laterally aligned with the first slot and the second slot.

In an embodiment of the invention, a method of forming a polarizer is provided. The method includes forming a first waveguide core, forming a first slotted waveguide component positioned over the first waveguide core, and forming a second slotted waveguide component positioned over the first slotted waveguide component. The first slotted waveguide component includes a second waveguide core and a third waveguide core separated by a first slot, and the second slotted waveguide component includes a fourth waveguide core and a fifth waveguide core separated by a second slot. The first waveguide core is laterally aligned with the first slot and the second slot.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
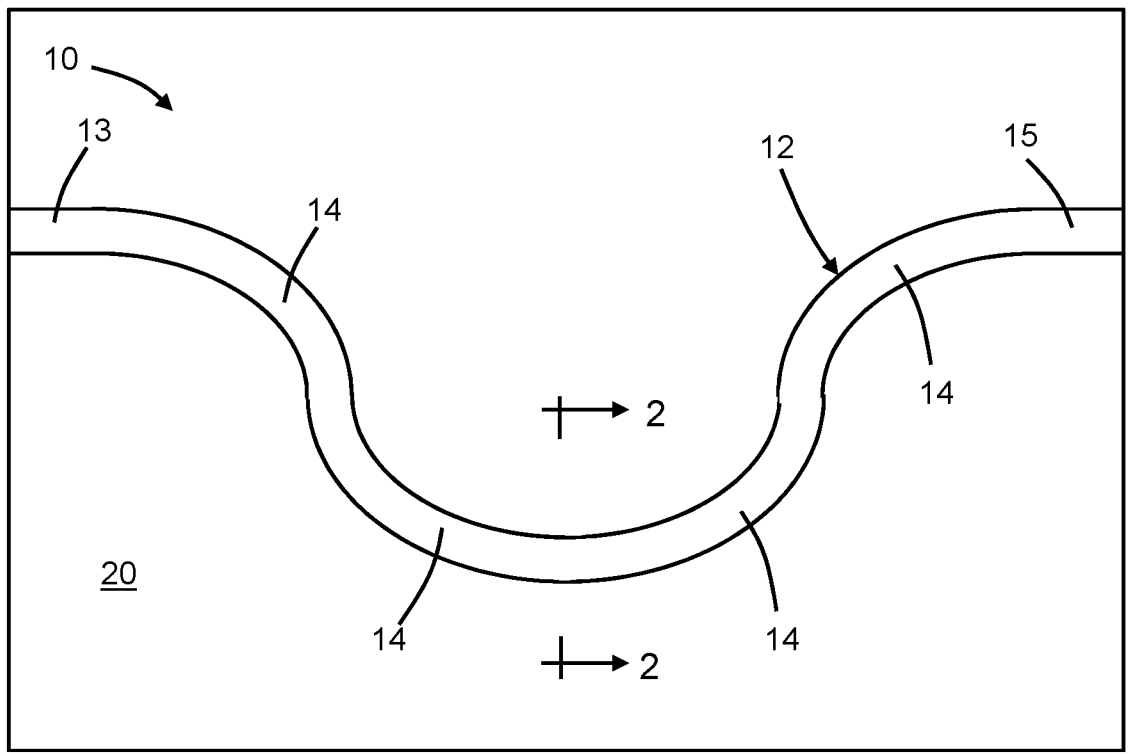
FIG. 1 is a diagrammatic top view of a photonics chip including a structure at an initial fabrication stage of a processing method in accordance with embodiments of the invention.
Figure 2:
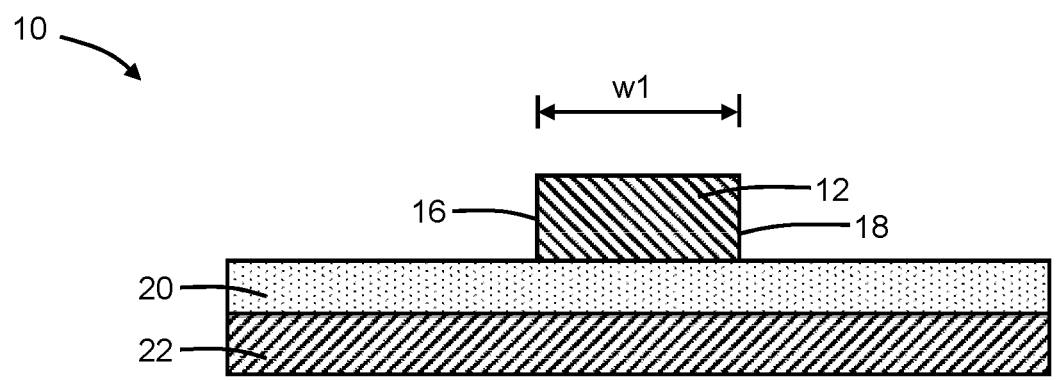
FIG. 2 is a cross-sectional view of the structure taken generally along line 2-2 in FIG. 1.

With reference to FIGS. 1, 2 and in accordance with embodiments of the invention, a structure 10 for a polarizer includes a section of a waveguide core 12 that is positioned over a dielectric layer 20. The section of the waveguide core 12 may extend along a serpentine path with multiple bends 14 providing alternating changes in direction. In an embodiment, the bends 14 may be a series of interconnected 90° bends. The waveguide core 12 may have side surfaces 16, 18 and a width, w1, measured as a perpendicular distance between the side surfaces 16, 18. The waveguide core 12 includes a section 13 that guides unpolarized laser light to the structure 10 and a section 15 that guides polarized laser light away from the structure 10. The bends 14 are longitudinally arranged between the section 13 and the section 15.

The waveguide core 12 may be composed of a single-crystal semiconductor material, such as single-crystal silicon. In an embodiment, the single-crystal semiconductor material may originate from a device layer of a silicon-on-insulator (SOI) wafer that further includes a buried oxide layer that provides the dielectric layer 20 and a substrate 22 composed of a single-crystal semiconductor material, such as single-crystal silicon. The waveguide core 12 may be patterned from a layer of single-crystal semiconductor material by lithography and etching processes during front-end-of-line processing. The layer of single-crystal semiconductor material may be fully etched to define waveguide core 12 as a rib waveguide as shown or, alternatively, only partially etched to define a ridge waveguide including a thinned residual layer on the dielectric layer 20. The waveguide core 12 may have coplanar or substantially coplanar top and bottom surfaces over its length.

Figure 3:
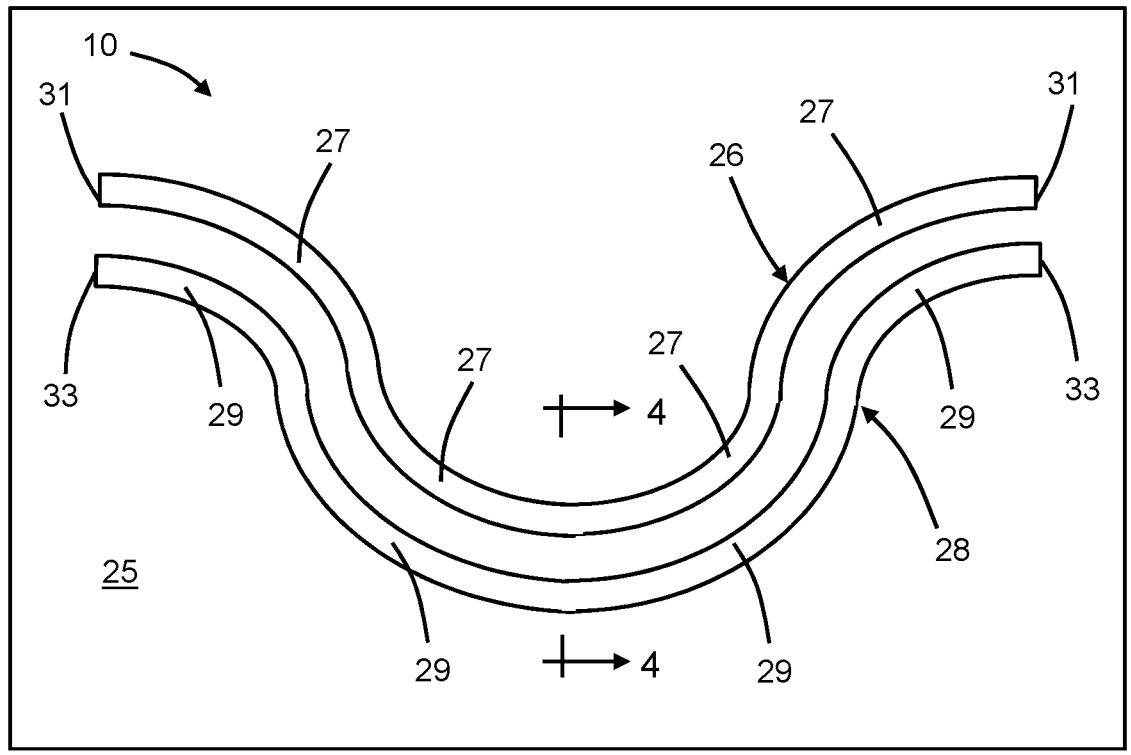
FIG. 3 is a diagrammatic top view of the structure at a fabrication stage of the processing method subsequent to FIG. 1.
Figure 4:
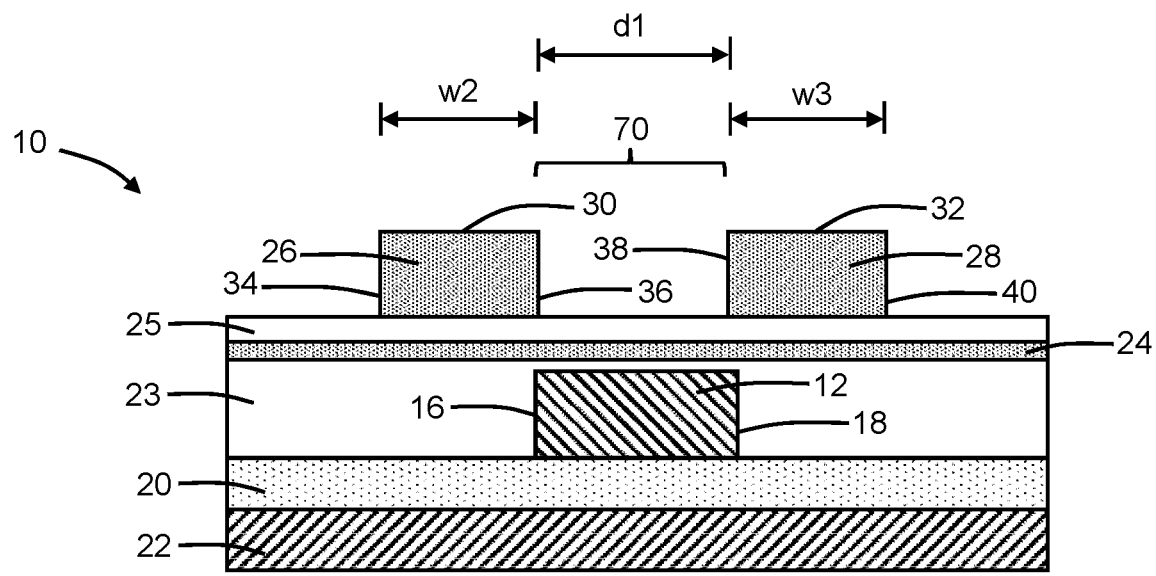
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 23 is formed over the waveguide core 12. The dielectric layer 23 may be composed of a dielectric material, such as silicon dioxide, deposited by chemical vapor deposition and planarized with, for example, chemical mechanical polishing to remove topography. The waveguide core 12 is embedded and buried in the dielectric material of the dielectric layer 23. Additional dielectric layers 24, 25 may be formed over the dielectric layer 23 and may be respectively composed of silicon nitride and silicon dioxide.

A waveguide core 26 and a waveguide core 28 are formed on the dielectric layer 25. The waveguide cores 26, 28 are positioned over the bends 14 of the waveguide core 12. The waveguide cores 26, 28 are located in a layer that is positioned in a different plane from the waveguide core 12 and have a side-by-side spatial relationship within their plane. The waveguide cores 26, 28 may be formed by depositing a layer of their constituent material on the dielectric layer 25 and patterning the deposited layer with photolithography and etching processes. In an embodiment, the waveguide cores 26, 28 may be composed of a dielectric material, such as silicon nitride. In an alternative embodiment, the waveguide cores 26, 28 may be composed of polycrystalline silicon (i.e., polysilicon).

The waveguide core 26 may extend along a serpentine path with multiple bends 27 providing alternating changes in direction, and the waveguide core 28 may extend along a serpentine path with multiple bends 29 also providing alternating changes in direction. The multiple bends 29 are spatially coordinated with the bends 27 and match the directionality of the bends 27 in terms of rotational sense. Each of the waveguide cores 26, 28 directionally reproduces the pattern of the bends 14 of the waveguide core 12. In an embodiment, the bends 27 may be a series of interconnected 90° bends. In an embodiment, the bends 29 may be a series of interconnected 90° bends that match the directionality of the bends 27.

The waveguide core 26 may have a top surface 30 and the waveguide core 28 may have a top surface 32 that is coplanar or substantially coplanar with the top surface 30. The waveguide core 26 extends lengthwise along its serpentine path between respective terminating ends 31, and the waveguide core 28 extends lengthwise along its serpentine path between respective terminating ends 33 that may terminate at approximately the same locations as the terminating ends 31.

The waveguide core 26 may have opposite side surfaces 34, 36 extending from the dielectric layer 24 to the top surface 30 and a width, w2, measured as a perpendicular distance between the opposite side surfaces 34, 36. The waveguide core 28 may have opposite side surfaces 38, 40 extending from the dielectric layer 24 to the top surface 32 and a width, w3, measured as a perpendicular distance between the opposite side surfaces 38, 40.

The waveguide cores 26, 28 provide a slotted waveguide component having alternating changes in direction provided by the bends 27, 29 and a slot or gap 70 defined in the space between the waveguide core 26 and the waveguide core 28. In that regard, the side surface 36 of the waveguide core 26 is separated laterally from the side surface 38 of the waveguide core 28 by the gap 70. The bends 16 of the waveguide core 12 are laterally aligned with the gap 70 between the waveguide cores 26, 28. The sections 13, 15 of the waveguide core 12 extend past each set of terminating ends 31 and 33 at the opposite ends of the slotted waveguide component defined by the waveguide cores 26, 28.

The gap 70 may be dimensioned with a width dimension, d1, along the entire serpentine lengths of the waveguide cores 26, 28. In an embodiment, the shapes of the waveguide cores 26, 28 may be based on parallel curves whose points are at a fixed normal distance from each other such that the width dimension, d1, of the gap 70 is constant or substantially constant over the entire length of the waveguide cores 26, 28. In an embodiment, the width dimension, d1, may be greater than 100 nm. In an embodiment, the width dimension, d1, may range from 100 nm to 800 nm. In an embodiment, the width dimension, d1, may be greater than 300 nm. In an embodiment, the width dimension, d1, may range from 300 nm to 800 nm. In an embodiment, the waveguide core 12 may have a width dimension that is equal or substantially equal to the width dimension d1.

Figure 5:
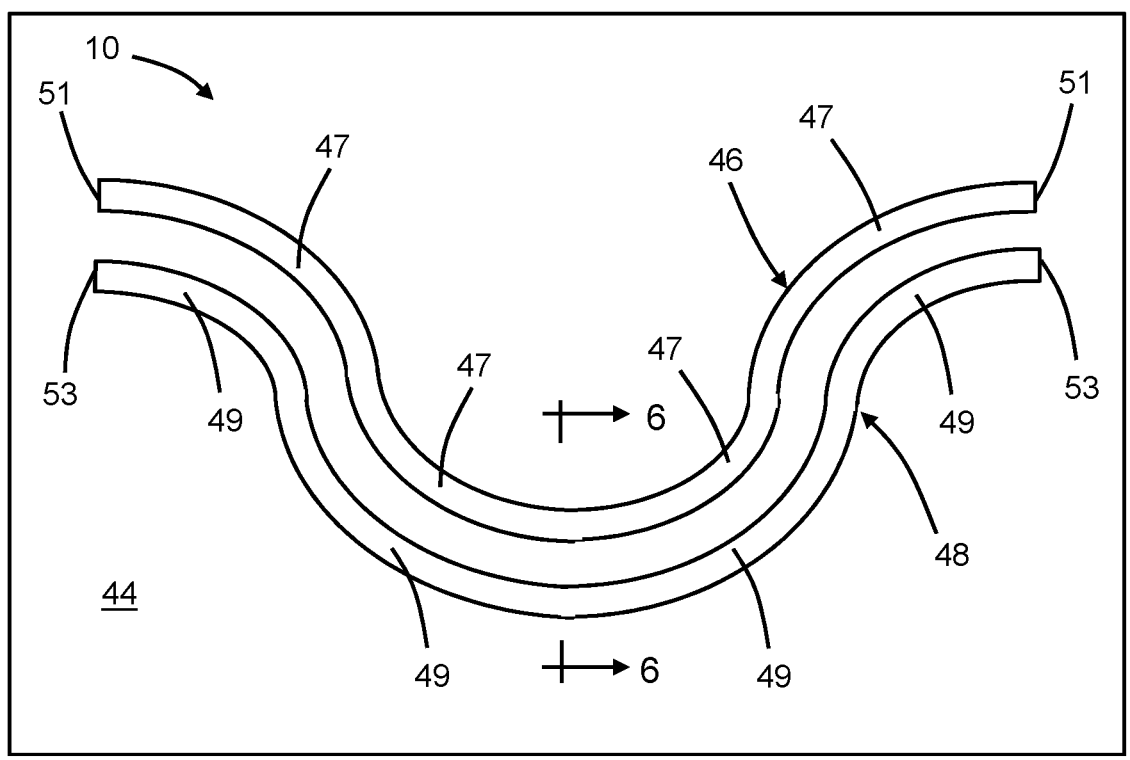
FIG. 5 is a diagrammatic top view of the structure at a fabrication stage of the processing method subsequent to FIG. 3.
Figure 6:
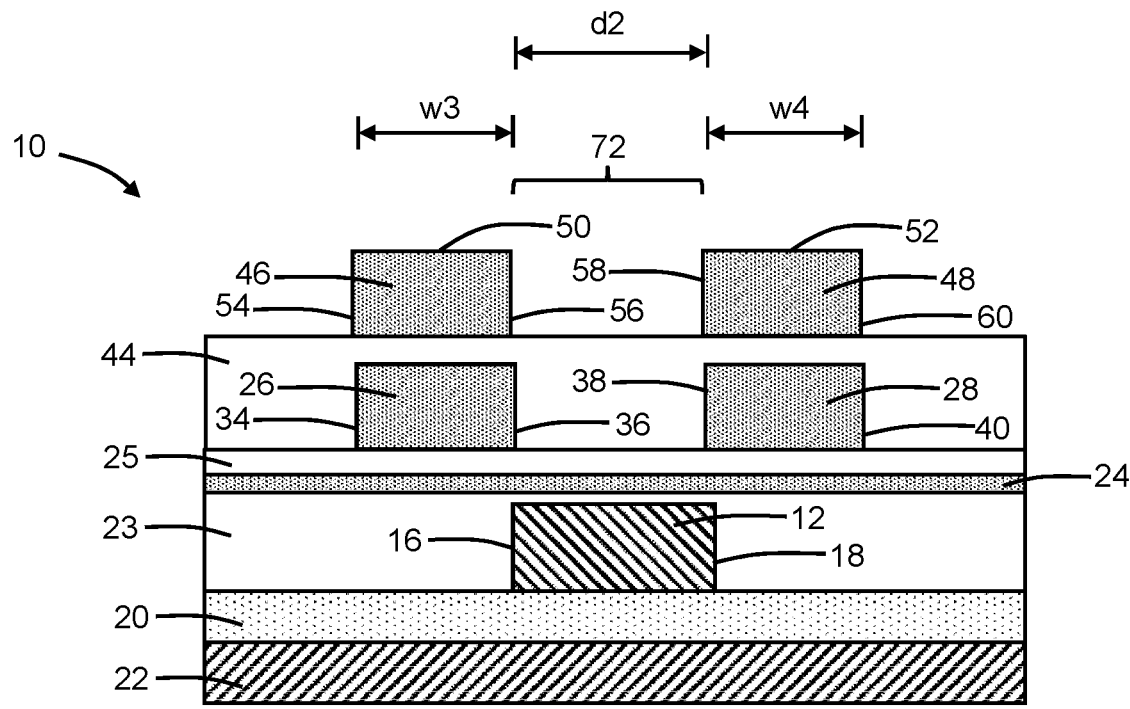
FIG. 6 is a cross-sectional view of the structure taken generally along line 6-6 in FIG. 5.

With reference to FIGS. 5, 6 in which like reference numerals refer to like features in FIGS. 3, 4 and at a subsequent fabrication stage, a dielectric layer 44 is formed over and about the waveguide cores 26, 28. The dielectric layer 44 may be composed of a dielectric material, such as silicon dioxide, deposited by chemical vapor deposition and planarized with, for example, chemical mechanical polishing to remove topography. The waveguide cores 26, 28 are embedded or buried in the dielectric material of the dielectric layer 44. In particular, a portion of the dielectric layer 44 may fill the gap 70 between the waveguide core 26 and the waveguide core 28. In embodiments, the dielectric material from the dielectric layer 44 may fully or substantially fully fill the gap 70 without generating or introducing voids.

A waveguide core 46 and a waveguide core 48 are formed on the dielectric layer 44. The waveguide cores 46, 48 are located in a layer that is positioned in a different plane from the waveguide cores 26, 28 and in a different plane from the waveguide core 12. The layer including the waveguide cores 46, 48 is stacked with the layer including the waveguide cores 26, 28. A portion of the dielectric layer 44 is positioned between the slotted waveguide component defined by the waveguide cores 26, 28 and the slotted waveguide component defined by the waveguide cores 46, 48. The waveguide cores 46, 48 have a side-by-side spatial relationship within their plane. The waveguide core 46 is positioned over the waveguide core 26 and the waveguide core 48 is positioned over the waveguide core 28. The waveguide cores 46, 48 may be formed by depositing a layer of its constituent material on the dielectric layer 44 and patterning the deposited layer with photolithography and etching processes. In an embodiment, the waveguide cores 46, 48 may be composed of silicon nitride.

The waveguide core 46 may extend along a serpentine path with multiple bends 47 providing alternating changes in direction, and the waveguide core 48 may extend along a serpentine path with multiple bends 49 also providing alternating changes in direction. The multiple bends 49 are spatially coordinated with the bends 47 and match the directionality of the bends 47 in terms of rotational sense. Each of the waveguide cores 46, 48 directionally reproduces the pattern of the bends 14 of the waveguide core 12, as well as the pattern of the bends 27, 29 of the waveguide cores 26, 28. In an embodiment, the bends 47 may be a series of interconnected 90° bends. In an embodiment, the bends 49 may be a series of interconnected 90° bends that match the directionality of the bends 47.

The waveguide core 46 may have a top surface 50 and the waveguide core 48 may have a top surface 52 that is coplanar or substantially coplanar with the top surface 50. The waveguide core 46 extends lengthwise along its serpentine path between respective terminating ends 51, and the waveguide core 48 extends lengthwise along its serpentine path between respective terminating ends 53 that may terminate at approximately the same locations as the terminating ends 51.

The waveguide core 46 may have opposite side surfaces 54, 56 extending from the dielectric layer 44 to the top surface 50 and a width, w4, measured as a perpendicular distance between the opposite side surfaces 54, 56. The waveguide core 48 may have opposite side surfaces 58, 60 extending from the dielectric layer 44 to the top surface 52 and a width, w5, measured as a perpendicular distance between the opposite side surfaces 58, 60.

The waveguide cores 46, 48 provide a slotted waveguide component having alternating changes in direction provided by the bends 47, 49 and a slot or gap 72 defined in the space between the waveguide core 46 and the waveguide core 48. In that regard, the side surface 56 of the waveguide core 46 is separated laterally from the side surface 58 of the waveguide core 48 by the gap 72. The bends 16 of the waveguide core 12 are laterally aligned with the gap 72 between the waveguide cores 46, 48. The slotted waveguide component defined by the waveguide cores 46, 48 and the slotted waveguide component defined by the waveguide cores 26, 28 are stacked with the waveguide cores 26, 28 positioned between the waveguide core 12 and the waveguide cores 46, 48. The sections 13, 15 of the waveguide core 12 extend past each set of terminating ends 51 and 53 at the opposite ends of the slotted waveguide component defined by the waveguide cores 46, 48.

The gap 72 may be dimensioned with a width dimension, d2, along the entire serpentine lengths of the waveguide cores 46, 48. In an embodiment, the shapes of the waveguide cores 46, 48 may be based on parallel curves whose points are at a fixed normal distance from each other such that the width dimension, d2, of the gap 72 is constant or substantially constant over the entire length of the waveguide cores 46, 48. In an embodiment, the width dimension, d2, may be greater than 100 nm. In an embodiment, the width dimension, d2, may range from 100 nm to 800 nm. In an embodiment, the width dimension, d2, may be greater than 300 nm. In an embodiment, the width dimension, d2, may range from 300 nm to 800 nm.

The waveguide core 46 may be positioned directly over the waveguide core 26 and, in an embodiment, the waveguide core 46 and the waveguide core 26 may have equal or substantially equal widths. The waveguide core 48 may be positioned directly over the waveguide core 28 and, in an embodiment, the waveguide core 48 and the waveguide core 28 may have equal or substantially equal widths. In an embodiment, the gap 70 and the gap 72 may have equal or substantially equal width dimensions. The gaps 70, 72 are located directly over the bends 14 of the waveguide core 12 and, in an embodiment, the gaps 70, 72 may be located directly over the bends 14 of the waveguide core 12. In an embodiment, the waveguide core 12 may have a width dimension that is equal or substantially equal to the width dimension d2. In an embodiment, the waveguide core 12 may have a width dimension that is equal or substantially equal to the width dimension d1 and equal or substantially equal to the width dimension d2.

Figure 7:
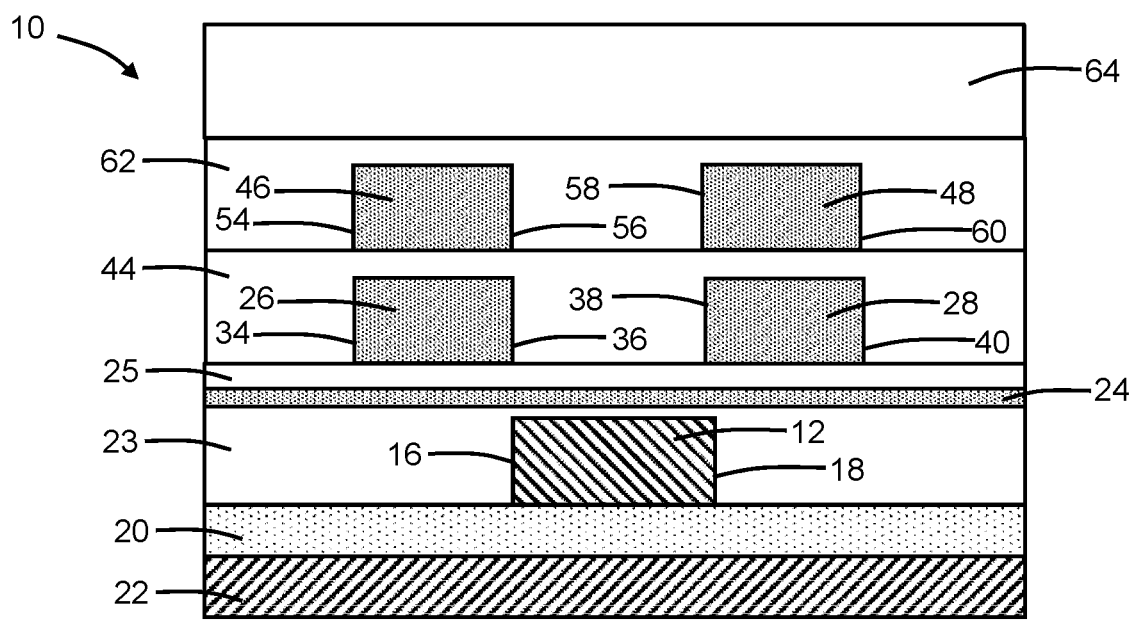
FIG. 7 is a cross-sectional view of the structure at a fabrication stage subsequent to FIG. 6.

With reference to FIG. 7 in which like reference numerals refer to like features in FIGS. 5, 6 and at a subsequent fabrication stage, a dielectric layer 62 is formed over the waveguide cores 46, 48. The dielectric layer 62 may be composed of a dielectric material, such as silicon dioxide, deposited by chemical vapor deposition and planarized with, for example, chemical mechanical polishing to remove topography. The waveguide cores 46, 48 are embedded or buried in the dielectric material of the dielectric layer 62. In particular, a portion of the dielectric layer 62 may fill the gap 72 between the waveguide core 46 and the waveguide core 48. In embodiments, the dielectric material from the dielectric layer 62 may fully or substantially fully fill the gap 72 without generating or introducing voids.

A back-end-of-line stack 64 is formed over the dielectric layer 62. The back-end-of-line stack 64 includes one or more dielectric layers that may be composed of dielectric material, such as silicon dioxide, and metallization composed of, for example, copper or aluminum, that is arranged in the one or more interlayer dielectric layers.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

Laser light propagating with both transverse magnetic (TM) and transverse electric (TE) mode components may be guided on the photonics chip by the section 13 of the waveguide core 12 to the structure 10. One mode component (e.g., the TE mode component) of the laser light experiences a high loss in the structure and the other mode component (e.g., the TM mode component) of the laser light may pass through the structure 10 with a low loss to be further guided on the photonics chip by the section 15 of the waveguide core 12 to a downstream destination on the photonics chip.

The waveguide cores 26, 28 and the waveguide cores 46, 48 may function to increase the extinction ratio for enhanced removal of the unwanted mode component (e.g., the TE component), and reduce the extinction ratio for improved transmission of the wanted mode component (e.g., the TM component). The stacking of the waveguide cores 46, 48 over the waveguide cores 26, 28 may permit the width dimension of the gap between the waveguide cores 26, 28 to be increased, which may improve the gap fill within the gaps 70, 72 by deposited dielectric material. The improved gap fill may be achieved while also improving the mode filtering ability of the structure 10 in comparison with conventional polarizers.

Figure 8:
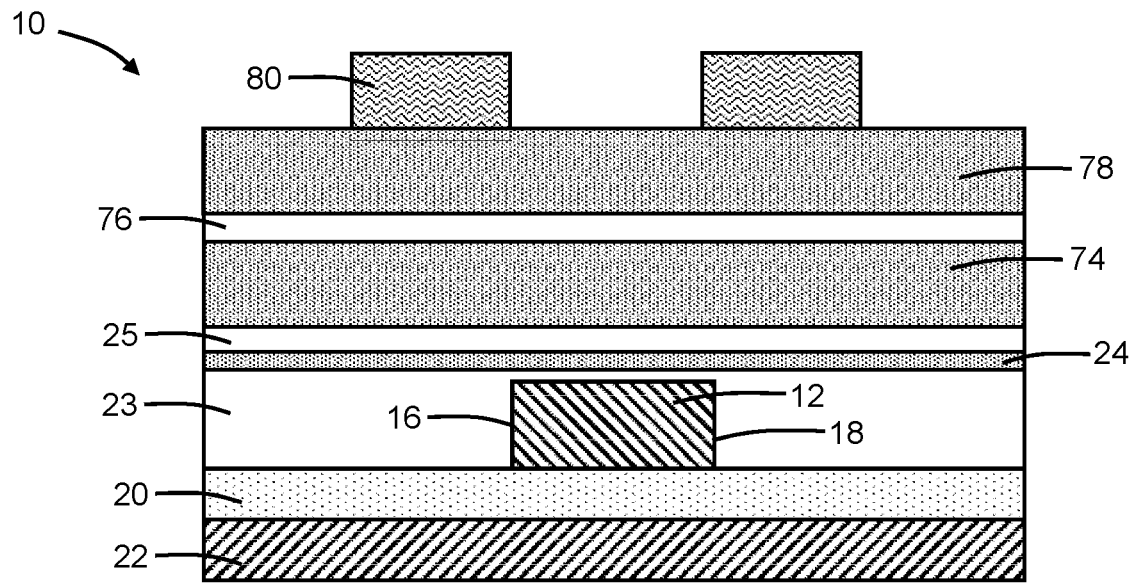
FIGS. 8-10 are cross-sectional views of a structure at successive fabrication stages of a processing method in accordance with alternative embodiments of the invention.

With reference to FIG. 8 in which like reference numerals refer to like features in FIG. 1 and in accordance with alternative embodiments of the invention, the waveguide cores 26, 28 and the waveguide cores 46, 48 may be formed by depositing a layer stack and then patterning the layer stack. The layer stack may include a layer 74 of the constituent material of the waveguide cores 26, 28, a dielectric layer 76 containing a low index material (e.g., silicon dioxide), and a layer 78 of the constituent material of the waveguide cores 46, 48. A resist mask 80 is formed by a lithography process that includes shapes located over the layer stack at the intended waveguide locations.

Figure 9:
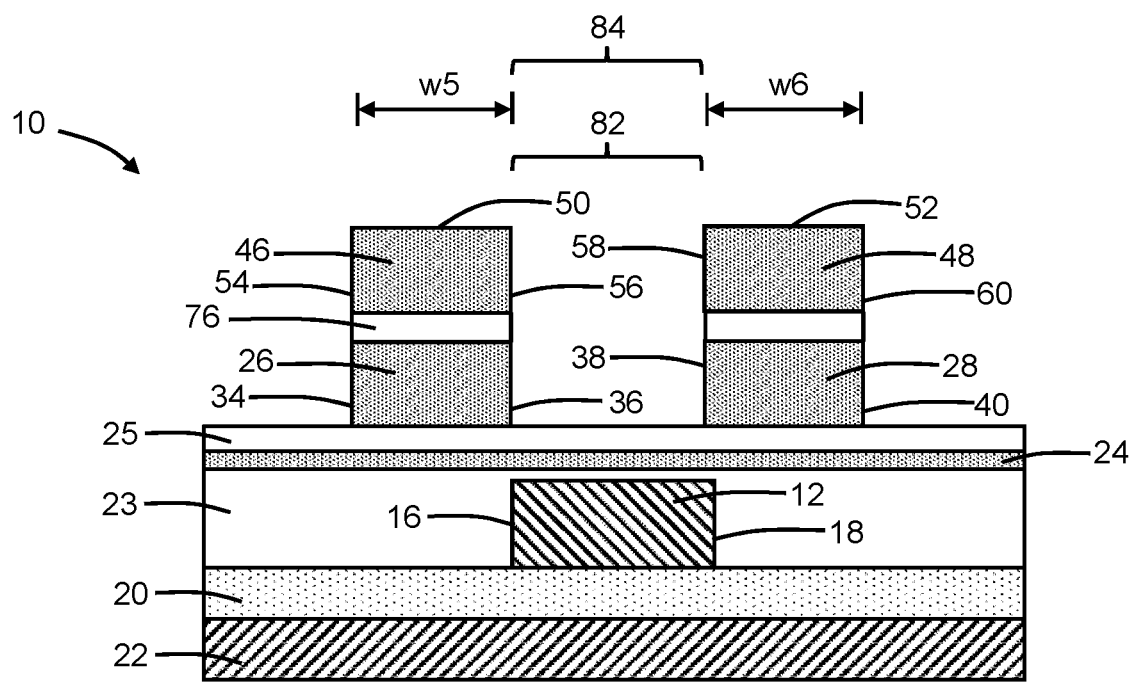

With reference to FIG. 9 in which like reference numerals refer to like features in FIG. 8 and at a subsequent fabrication stage, the layer stack is patterned by an etching process to define the waveguide cores 26, 28 and the waveguide cores 46, 48. The shapes of the resist mask 80 defines the location of the waveguide cores 26, 28 and the location of the waveguide cores 46, 48. A portion of the dielectric layer 76 is arranged between the waveguide core 26 and the waveguide core 46, and another portion of the dielectric layer 76 is arranged between the waveguide core 28 and the waveguide core 48. The waveguide cores 26, 28 and the waveguide cores 46, 48 are patterned by the same lithography and etching processes.

A slot or gap 82, which is similar to gap 70, is formed that is arranged between the waveguide core 26 and the waveguide core 28. A slot or gap 84, which is similar to gap 72, is formed that is arranged between the waveguide core 46 and the waveguide core 48. The width dimension of the gaps 82, 84 may be equal or substantially equal. The width dimension, w4, of the waveguide core 26 and the waveguide core 46 may be equal or substantially equal. The width dimension, w5, of the waveguide core 28 and the waveguide core 48 may be equal or substantially equal.

Figure 10:
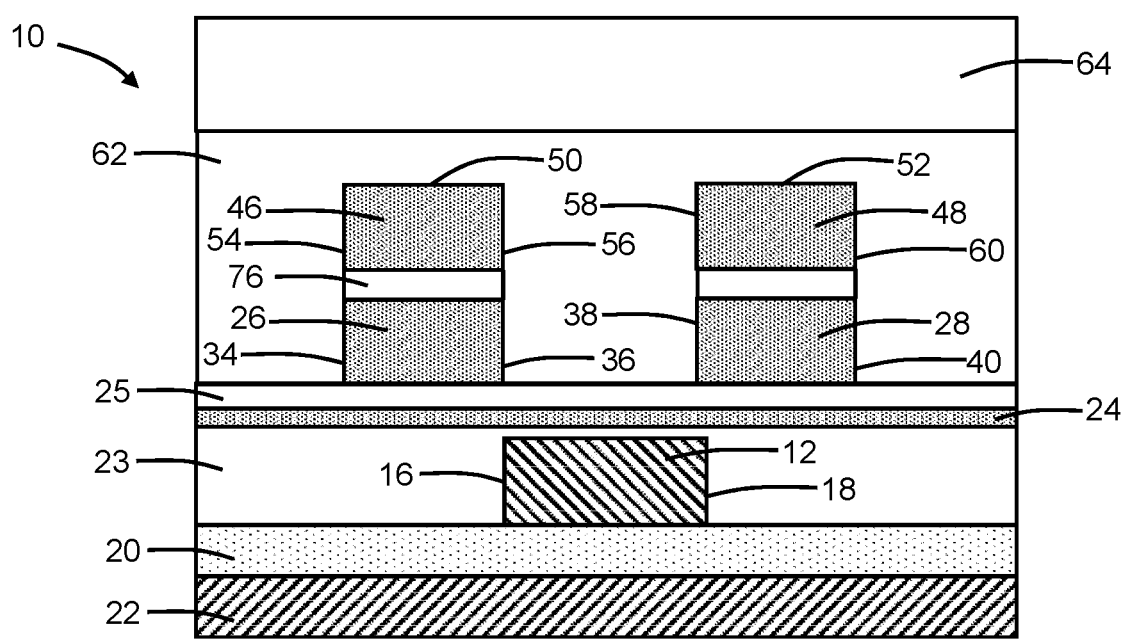

With reference to FIG. 10 in which like reference numerals refer to like features in FIG. 9 and at a subsequent fabrication stage, the dielectric layer 62 is formed, which includes respective portions that fill the gaps 82, 84 and portions that fill the space about the waveguide cores 26, 28 and waveguide cores 46, 48. The spaces between the waveguide core 26 and the waveguide core 46 and between the waveguide core 28 and the waveguide core 48 are prefilled by portions of the dielectric layer 76 when the dielectric layer 62 is formed. The back-end-of-line stack 64 is formed over the dielectric layer 62.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarizer, the structure comprising:
   a first waveguide core;
   a first slotted waveguide component positioned over the first waveguide core, the first slotted waveguide component including a second waveguide core and a third waveguide core separated by a first slot; and
   a second slotted waveguide component positioned over the first slotted waveguide component, the second slotted waveguide component including a fourth waveguide core and a fifth waveguide core separated by a second slot,
   wherein the first waveguide core is laterally aligned with the first slot and the second slot.

2. The structure of claim 1 wherein the first waveguide core is comprised of single-crystal silicon, the second waveguide core and the third waveguide core are comprised of silicon nitride, and the fourth waveguide core and the fifth waveguide core are comprised of silicon nitride.

3. The structure of claim 1 wherein the first waveguide core is comprised of single-crystal silicon, the second waveguide core and the third waveguide core are comprised of polysilicon, and the fourth waveguide core and the fifth waveguide core are comprised of silicon nitride.

4. The structure of claim 1 wherein the first slot has a first width dimension, and the second slot has a second width dimension that is substantially equal to the first width dimension.

5. The structure of claim 1 wherein the second waveguide core has a first terminating end and a second terminating end opposite to the first terminating end of the second waveguide core, and the third waveguide core has a first terminating end and a second terminating end opposite to the first terminating end of the third waveguide core.

6. The structure of claim 1 wherein the fourth waveguide core has a first terminating end and a second terminating end opposite to the first terminating end of the fourth waveguide core, and the fifth waveguide core has a first terminating end and a second terminating end opposite to the first terminating end of the fifth waveguide core.

7. The structure of claim 1 further comprising:
   a first dielectric layer over the first slotted waveguide component, the first dielectric layer including a first portion that is positioned in the first slot.

8. The structure of claim 7 wherein the first dielectric layer includes a second portion positioned between the first waveguide core and the third waveguide core, and a third portion positioned between the second waveguide core and the fourth waveguide core.

9. The structure of claim 8 further comprising:
   a second dielectric layer over the second slotted waveguide component, the second dielectric layer including a portion positioned in the second slot.

10. The structure of claim 1 wherein the fourth waveguide core is positioned directly over the second waveguide core, and the fifth waveguide core is positioned directly over the third waveguide core.

11. The structure of claim 1 wherein the second waveguide core has a first top surface, the fourth waveguide core is positioned directly over the first top surface of the second waveguide core, the third waveguide core has a second top surface, and the fifth waveguide core is positioned directly over the second top surface of the third waveguide core.

12. The structure of claim 1 wherein the first slotted waveguide component is positioned within a first layer in a first plane, the second slotted waveguide component is positioned within a second layer in a second plane, and the second layer is stacked with the first layer.

13. The structure of claim 1 further comprising:
   a dielectric layer over the first slotted waveguide component and the second slotted waveguide component, the dielectric layer including a first portion that is positioned in the first slot and a second portion that is positioned in the second slot.

14. The structure of claim 1 wherein the first waveguide core includes a section having a first plurality of bends that are laterally aligned with the first slot and the second slot, the first slotted waveguide component includes a second plurality of bends, the second slotted waveguide component includes a third plurality of bends, and the first plurality of bends of the first waveguide core are laterally aligned with the first slot and the second slot.

15. The structure of claim 14 wherein the first plurality of bends of the first waveguide core are arranged in a first serpentine path, the second plurality of bends of the first slotted waveguide component are arranged in a second serpentine path, and the third plurality of bends of the second slotted waveguide component are arranged in a third serpentine path.

16. A method of forming a polarizer, the method comprising:
   forming a first waveguide core;
   forming a first slotted waveguide component positioned over the first waveguide core; and
   forming a second slotted waveguide component positioned over the first slotted waveguide component,
   wherein the first slotted waveguide component includes a second waveguide core and a third waveguide core separated by a first slot, the second slotted waveguide component includes a fourth waveguide core and a fifth waveguide core separated by a second slot, and the first waveguide core is laterally aligned with the first slot and the second slot.

17. The method of claim 16 further comprising:
   forming a first dielectric layer over the first slotted waveguide component,
   wherein the first dielectric layer includes a first portion that is positioned in the first slot.

18. The method of claim 17 wherein the first dielectric layer includes a second portion positioned between the first waveguide core and the third waveguide core, and a third portion positioned between the second waveguide core and the fourth waveguide core.

19. The method of claim 17 further comprising:
   forming a second dielectric layer over the second slotted waveguide component,
   wherein the second dielectric layer includes a portion positioned in the second slot.

20. The method of claim 16 wherein the first slotted waveguide component and the second slotted waveguide component are formed by patterning a layer stack, and further comprising:
   forming a dielectric layer over the first slotted waveguide component and the second slotted waveguide component,
   wherein the dielectric layer includes a first portion that is positioned in the first slot and a second portion that is positioned in the second slot.

* * * * *